(12) United States Patent
Lawson

(10) Patent No.: US 6,170,916 B1
(45) Date of Patent: Jan. 9, 2001

(54) TAILGATE OPERATING ASSEMBLY

(75) Inventor: Tom Lawson, Channahon, IL (US)

(73) Assignee: L&M Manufacturing, Inc., Monmouth, IL (US)

( * ) Notice: Under 35 U.S.C. 154(b), the term of this patent shall be extended for 0 days.

(21) Appl. No.: 09/358,600

(22) Filed: Jul. 21, 1999

(51) Int. Cl.⁷ .............................. B60P 1/04; B60P 1/28; B60P 1/267; B61D 9/00; B65G 67/32
(52) U.S. Cl. .................................. 298/23 MD; 298/23 R
(58) Field of Search ...................... 298/23 R, 23 MD, 298/23 M, 23 A, 23 TT

(56) References Cited

U.S. PATENT DOCUMENTS

| 3,322,464 | * | 5/1967 | Merritt et al. . |
| 3,860,288 | * | 1/1975 | Martin et al. . |
| 5,143,496 | * | 9/1992 | Smith et al. . |
| 5,281,074 | * | 1/1994 | Mashuda . |
| 5,518,287 | * | 5/1996 | Totani . |

* cited by examiner

Primary Examiner—D. Glenn Dayoan
Assistant Examiner—Scott Carpenter
(74) Attorney, Agent, or Firm—Ernest Kettelson

(57) ABSTRACT

A tailgate operating assembly for a dump truck or dump trailer comprises a pair of hydraulic cylinders, one mounted horizontally on each opposite side wall of the cargo box adjacent the upper edge of the pivotally mounted tailgate, connected thereto by pivotal links for pivoting the tailgate toward its open position when the plungers of the hydraulic cylinders are extended and for pivoting the tailgate toward its closed position when the plungers are retracted. Each cylinder includes a pressure release mechanism to release internal pressure of each cylinder during retraction of the plungers and closure of the tailgate which enables the gravity weight of the tailgate to urge the plungers toward their retracted positions for more even and rapid movement of the tailgate to its fully closed position.

13 Claims, 2 Drawing Sheets

TAILGATE OPERATING ASSEMBLY

FIELD OF THE INVENTION

This invention relates to the field of operating assemblies to raise and lower the tailgates of dump trucks and semi-trailers having a mechanism to raise the front end of the trailer for unloading the contents through the open rear wall of the trailer when the tailgate has been raised.

BACKGROUND OF THE INVENTION

One of the problems in unloading dump trucks and trailers having a front end lift mechanism is to spread the contents evenly while being unloaded and as the truck or trailer is being moved forwardly at the proper speed. Prior art mechanisms for opening and closing the tailgates made it difficult to control the amount of opening needed to achieve even spreading of the contents while being unloaded. The present invention provides an improved tailgate operating assembly.

SUMMARY OF THE INVENTION

The tailgate operating assembly in accordance with this invention provides a hydraulic cylinder mounted horizontally along each opposite side wall of the trailer cargo box, with the plungers thereof facing rearwardly. One end of a lever or armature is connected to the outer end of the plunger of each cylinder, each lever or armature being pivotally hinged to respective ones of the opposite side walls of the cargo box, and the opposite operating end of each lever or armature is connected to respective facing portions of the upper edge of the tailgate. When the plungers are moved toward their extended positions, the tailgate begins to raise. When the plungers are moved toward their retracted position the tailgate begins to close. A pressure release mechanism is provided for each of the hydraulic cylinders to facilitate retraction of the pistons and corresponding closure of the tailgate. The pressure release mechanism consists of a pressure release port in each of the horizontally mounted hydraulic cylinders, located at the most upwardly facing portion of the cylindrical wall and near the plunger end of the cylinder. A pressure release conduit is connected at one end to each of the pressure release ports of the respective cylinders and the opposite discharge ends of each pressure release conduit extend through an aperture in the respective side walls of the cargo box for discharge into the cavity of the box. Thus, the gravity weight of the tailgate as it moves toward its closed position can more freely urge the plungers and pistons of the respective cylinders to their retracted positions when the internal pressure of the cylinders is released.

DESCRIPTION OF PREFERRED EMBODIMENT

Figure 1:
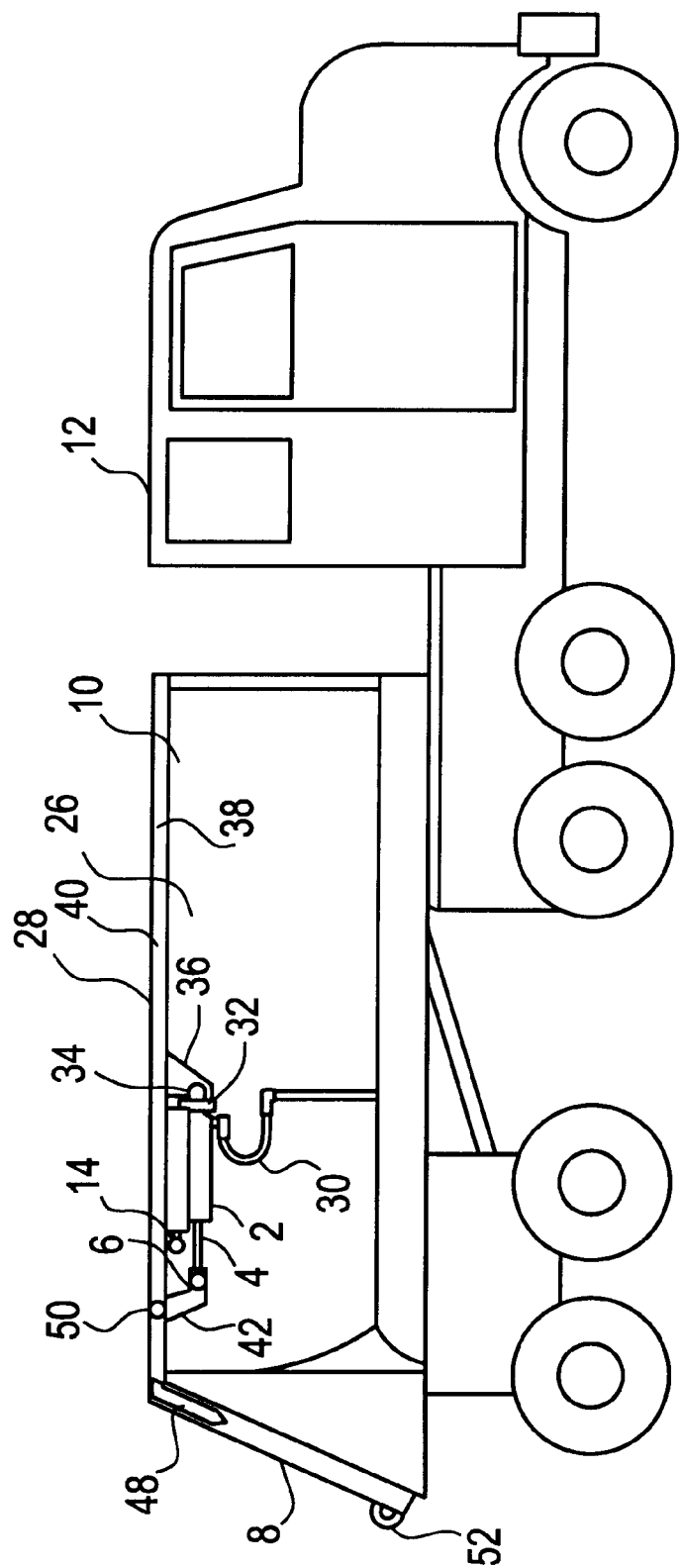
FIG. 1 is a side elevation view of a semi-truck and trailer having a front end lift box for unloading through the rear when the tailgate is opened, and showing the hydraulic cylinder on one side of the trailer box for raising the tailgate having a pressure release mechanism in accordance with the present invention.
Figure 2:
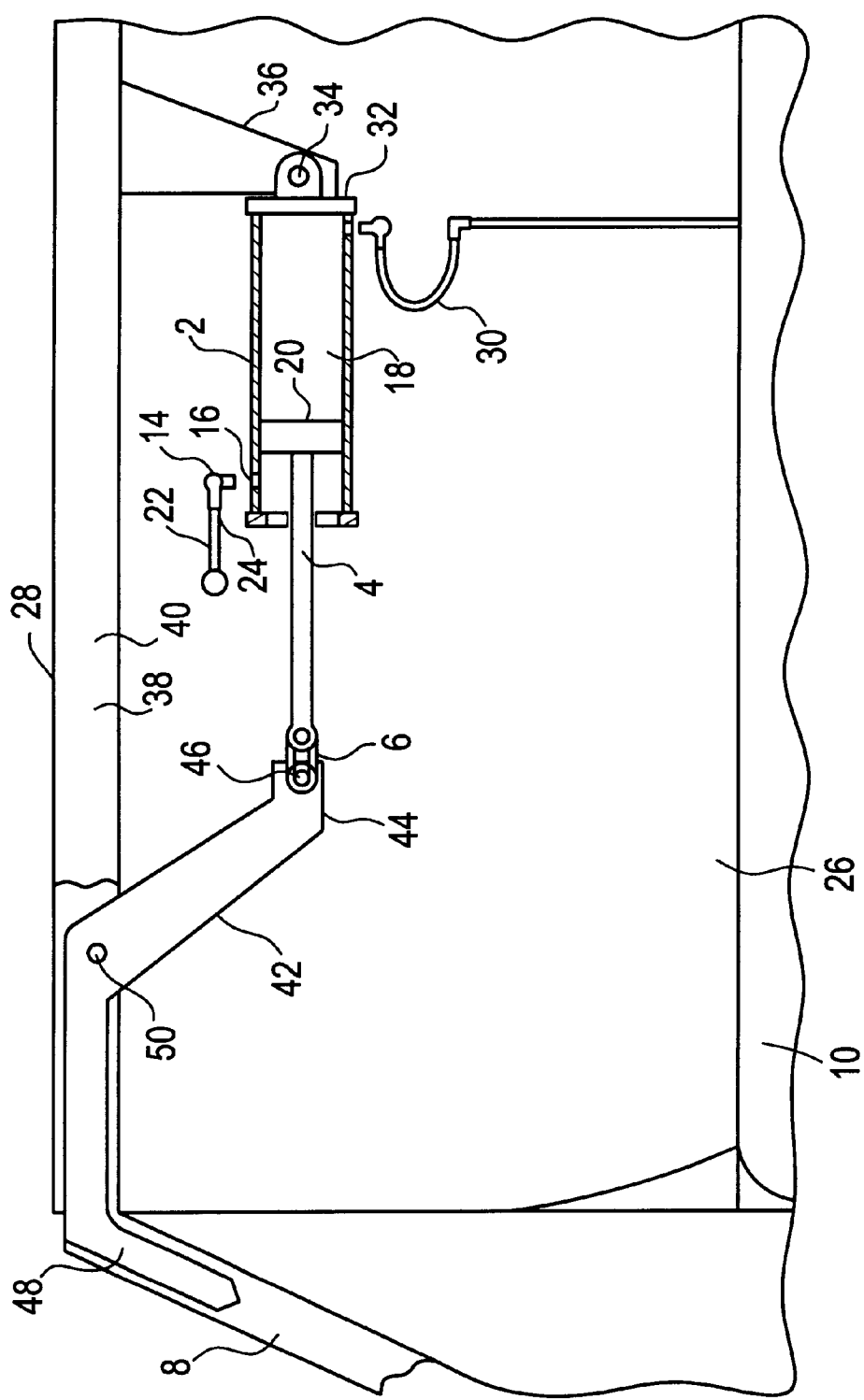
FIG. 2 is an enlarged view of the hydraulic cylinder shown in FIG. 1, partly in section, and with the fittings removed from the cylinder to show the ports but in position for re-threading into the respective ports, also showing a portion of the side wall of the trailer and of the tailgate to more clearly illustrate the working parts of the tailgate lift mechanism.

A tailgate operating assembly in accordance with this invention includes a pair of hydraulic cylinders 2 mounted to extend horizontally on opposite side walls of a truck or trailer box having a liftable front end, each cylinder having a plunger 4 connected by a link mechanism 6 to open the tailgate 8 of a trailer 10 of a semi-truck and trailer 12 when the plunger is extended and to close the tailgate by gravity which at the same time moves the plunger 4 to its retracted position. To enable the plunger 4 to retract more easily, a bleeder air fitting 14 is secured at one end to a port 16 opening to the plunger end portion of the cavity 18 of each of the hydraulic cylinders 2 and beyond the furthest travel of the piston 20 within the cavity 18 of the cylinder 2. The port 16 is provided at the most upwardly facing portion of the cylinder wall. An extension conduit 22 extends from the discharge end 24 of the fitting 14 along the respective side walls 26 of the trailer 10 on which the pair of hydraulic cylinders are mounted and opens through an aperture in the side walls 26 into the cargo hold of the trailer to discharge any drips that may escape from the hydraulic cylinder into the cargo hold.

The hydraulic cylinders 2 are connected to a hydraulic pump (not shown) by the feeder line 30 connected to the opposite end 32 of each of the hydraulic cylinders and shown extending down the side walls 26 of the trailer 10. The hydraulic cylinders are mounted along the upper edge 28 of each opposite side wall 26 of the trailer, the opposite end 32 of each cylinder being connected by a hinge pin 34 to a bracket 36 welded to the side 38 of respective outwardly projecting tubular portions 40 of the upper edge 28 of the trailer side walls. The link mechanism 6 to which the outer end of the plunger 4 is connected comprises a lever 42 having its lower end 44 pivotally connected to the plunger 4 by a hinge pin 46 and its operating end 48 welded to an upper portion of the tailgate 8. The lever 42 is pivotally mounted on the side 38 of the outwardly projecting portion 40 of the upper edge 28 of the trailer by a pivot pin 50.

In operation, the tailgate locking mechanism 52 is released by the driver in the cab of the semi-trailer, and the front end of the trailer box begins to rise when the driver activates the lift mechanism. The hydraulic cylinders 2 are then activated by a control in the cab to extend their respective plungers 4. The lower end 44 of the lever 42 is then moved rearwardly which causes the lever 42 to pivot on the pivot pin 50 thereby raising the operating end 48 of the lever and the tailgate 8 to which the operating end 48 is welded. After the load in the trailer has been unloaded, the front end of the trailer box is lowered and the tailgate may be then moved to its closed position by releasing hydraulic pressure to the cylinder 2 whereupon the plunger 4 can retract by force of gravity and the weight of the tailgate moving downwardly toward its closed position. The bleeder air tube 14 enables release of pressure within the cylinder cavity that would otherwise retard movement of the plunger toward its retracted position and in turn slow down and tend to prevent movement of the tailgate 8 to its fully closed position.

I claim:

1. A tailgate operating assembly comprises a first pressure receptive cylinder connected to a pressure source, an elongated cavity in said first cylinder having a retraction facing end and an extension facing end, said elongated cavity of said first cylinder having a closed retraction facing end wall at its retraction facing end and an extension facing end wall at its extension facing end having an aperture therein, a piston mounted in said elongated cavity for reciprocal movement therein between said retraction facing and extension facing ends thereof, an elongated operating member having a retraction facing end secured to said piston, an extending portion forward thereof extending through said aperture in said extension facing end wall, and an extension facing end of said elongated operating member extending outwardly of said cavity, said operating member being reciprocally movable between an extended position when said piston is moved toward said extension facing end of said cavity and a retracted position when said piston is moved toward said retraction facing end thereof, and first pressure release means opening continuously to the non-pressurized ambient atmosphere operatively associated with said first cylinder for releasing pressure within said cavity when said piston is being moved toward said retraction facing end portion thereof.

2. A tailgate operating assembly as set forth in claim 1, wherein said first pressure receptive cylinder is mounted on the cargo box of a vehicle having a tailgate pivotably mounted for movement between an open position when raised and a closed position when lowered, including said cargo box and said tailgate, said tailgate having an upper edge portion and a lower edge portion, first link means for connecting said upper edge portion of said tailgate to said extension facing end of said elongated operating member of said first pressure receptive cylinder to raise said tailgate to said open position when said elongated operating member is moved to its said extended position and to lower said tailgate to said closed position when said elongated operating member is moved to its said retracted position.

3. A tailgate operating assembly as set forth in claim 2, including a second pressure receptive cylinder mounted on said cargo box of said vehicle, an elongated cavity in said second cylinder having a retraction facing end and an extension facing end, said cavity of said second cylinder having a closed retraction facing end wall at its retraction facing end and an extension facing end wall at its extension facing end having an aperture therein, a piston mounted in said elongated cavity of said second cylinder for reciprocal movement therein between said retraction facing and extension facing ends thereof, an elongated operating member having a retraction facing end secured to said piston mounted in said elongated cavity of said second cylinder, an extending portion forward thereof extending through said aperture in said extension facing end wall of said cavity of said second cylinder, and an extension facing end of said elongated operating member extending outwardly of said cavity of said second cylinder, said operating member being reciprocally movable between an extended position when said piston is moved toward said extension facing end of said cavity of said second cylinder and a retracted position when said piston is moved toward said retraction facing end thereof, and second pressure release means opening continuously to the non-pressurized ambient atmosphere operatively associated with said second cylinder for releasing pressure within said cavity when said piston is being moved toward said retraction facing end portion thereof, second link means for connecting said upper edge portion of said tailgate to said extension facing end of said elongated operating member of said second pressure receptive cylinder to raise said tailgate to said open position when said elongated operating member is moved to its said extended position and to lower said tailgate to said closed position when said elongated operating member is moved to its said retracted position.

4. A tailgate operating assembly as set forth in claim 1, wherein said first pressure receptive cylinder is a hydraulic cylinder.

5. A tailgate operating assembly as set forth in claim 3, wherein said second pressure receptive cylinder is a hydraulic cylinder.

6. A tailgate operating assembly as set forth in claim 1, wherein said first pressure release means includes a pressure release port opening continuously to said non-pressurized ambient atmosphere and to said cavity of said first pressure receptive cylinder.

7. A tailgate operating assembly as set forth in claim 3, wherein said second pressure release means includes a pressure release port opening continuously to said non-pressurized ambient atmosphere and to said cavity of said second pressure receptive cylinder.

8. A tailgate operating assembly as set forth in claim 6, wherein said first pressure receptive cylinder extends horizontally, said pressure release port opening to said cavity of said first pressure receptive cylinder opens thereto at an upwardly facing portion near its said extension facing end.

9. A tailgate operating assembly as set forth in claim 7, wherein said pressure release port opening to said cavity of said second pressure receptive cylinder opens thereto at an upwardly facing portion near its extension facing end.

10. A tailgate operating assembly as set forth in claim 1, wherein said elongated operating member comprises a cylindrical shaft.

11. A tailgate operating assembly as set forth in claim 2, wherein said first link means for connecting said upper edge portion of said tailgate to said extension facing end of said elongated operating member of said first pressure receptive cylinder comprises a lever having a lower end pivotally connected to said extension facing end of said elongated operating member, said lever having an operating lever end connected to an upper portion of said pivotally mounted tailgate.

12. A tailgate operating assembly as set forth in claim 3, wherein said second link means for connecting said upper edge portion of said tailgate to said extension facing end of said elongated operating member of said second pressure receptive cylinder comprises a lever having a lower end pivotally connected to said extension facing end of said elongated operating member, said lever having an operating lever end connected to an upper portion of said pivotally mounted tailgate, said lever having an upper end connected to said upper edge portion of said tailgate.

13. A tailgate operating assembly comprises a first pressure receptive cylinder connected to a pressure source, an elongated cavity in said first cylinder having a retraction facing end and an extension facing end, said elongated cavity of said first cylinder having a closed retraction facing end wall at its retraction facing end and an extension facing end wall at its extension facing end having an aperture therein, a piston mounted in said elongated cavity for reciprocal movement therein between said retraction facing and extension facing ends thereof, an elongated operating member having a retraction facing end secured to said piston, an extending portion forward thereof extending through said aperture in said extension facing end wall, and an extension facing end of said elongated operating member extending outwardly of said cavity, said operating member being reciprocally movable between an extended position when said piston is moved toward said extension facing end of said cavity and a retracted position when said piston is moved toward said retraction facing end thereof, and first pressure release means operatively associated with said first cylinder for releasing pressure within said cavity when said piston is being moved toward said retraction facing end portion thereof, wherein said first pressure receptive cylinder is mounted on the cargo box of a vehicle having a tailgate pivotably mounted for movement between an open position when raised and a closed position when lowered, including said cargo box and said tailgate, said tailgate having an upper edge portion and a lower edge portion, first link means for connecting said upper edge portion of said tailgate to said extension facing end of said elongated operating member of said first pressure receptive cylinder to raise said tailgate to said open position when said elongated operating member is moved to its said extended position and to lower said tailgate to said closed position when said elongated operating member is moved to its said retracted position, including a second pressure receptive cylinder mounted on said cargo box of said vehicle, an elongated cavity in said second cylinder having a retraction facing end and an extension facing end, said cavity of said second cylinder having a closed retraction facing end wall at its retraction facing end and an extension facing end wall at its extension facing end having an aperture therein, a piston mounted in said elongated cavity of said second cylinder for reciprocal movement therein between said retraction facing and extension facing ends thereof, an elongated operating member having a retraction facing end secured to said piston mounted in said elongated cavity of said second cylinder, an extending portion forward thereof extending through said aperture in said extension facing end wall of said cavity of said second cylinder, and an extension facing end of said elongated operating member extending outwardly of said cavity of said second cylinder, said operating member being reciprocally movable between an extended position when said piston is moved toward said extension facing end of said cavity of said second cylinder and a retracted position when said piston is moved toward said retraction facing end thereof, and second pressure release means operatively associated with said second cylinder for releasing pressure within said cavity when said piston is being moved toward said retraction facing end portion thereof, second link means for connecting said upper edge portion of said tailgate to said extension facing end of said elongated operating member of said second pressure receptive cylinder to raise said tailgate to said open position when said elongated operating member is moved to its said extended position and to lower said tailgate to said closed position when said elongated operating member is moved to its said retracted position, wherein said cargo box of said vehicle includes a first side wall having an outwardly facing surface and an inwardly facing surface, and a second side wall having an outwardly facing surface and an inwardly facing surface, said first pressure receptive cylinder is mounted along the outwardly facing surface of said first side wall, said second pressure receptive cylinder is mounted along the outwardly facing surface of said second side wall, said first pressure release means includes a first pressure release port opening to said cavity of said first pressure receptive cylinder, a first pressure release conduit having a connected end connected to said first pressure release port and a discharge end extending through a pressure release conduit receiving aperture in said first side wall of said cargo box for discharge into said cargo box, including said pressure release conduit receiving aperture in said first side wall, said second pressure release means includes a second pressure release port opening to said cavity of said second pressure receptive cylinder, a second pressure release conduit having a connected end connected to said second pressure release port and a discharge end extending through a pressure release conduit receiving aperture in said second side wall of said cargo box for discharge into said cargo box, including said pressure release conduit receiving aperture in said second side wall.

\* \* \* \* \*